United States Patent
Fetkovich et al.

(10) Patent No.: US 6,874,087 B1
(45) Date of Patent: Mar. 29, 2005

(54) INTEGRITY CHECKING AN EXECUTABLE MODULE AND ASSOCIATED PROTECTED SERVICE PROVIDER MODULE

(75) Inventors: John Edward Fetkovich, Endicott, NY (US); George William Wilhelm, Jr., Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/352,285

(22) Filed: Jul. 13, 1999

(51) Int. Cl.[7] .............................................. H04L 9/00
(52) U.S. Cl. ...................... 713/200; 713/168; 713/169
(58) Field of Search ............................... 713/168–170, 713/176, 187–188, 200–201; 705/50–51, 58–59

(56) References Cited

U.S. PATENT DOCUMENTS

| | | | |
|---|---|---|---|
| 5,398,196 A | | 3/1995 | Chambers .................. 364/580 |
| 5,421,006 A | * | 5/1995 | Jablon et al. ................. 714/36 |
| 5,440,723 A | | 8/1995 | Arnold et al. ............... 395/181 |
| 5,572,590 A | | 11/1996 | Chess ............................ 380/4 |
| 5,696,822 A | | 12/1997 | Nachenberg .................... 380/4 |
| 5,765,030 A | | 6/1998 | Nachenberg et al. .. 395/183.09 |
| 5,826,013 A | | 10/1998 | Nachenberg ................ 395/186 |
| 5,991,399 A | * | 11/1999 | Graunke et al. ............ 380/279 |
| 6,105,137 A | * | 8/2000 | Graunke et al. ............ 713/201 |
| 6,363,486 B1 | * | 3/2002 | Knapton, III ............... 713/200 |
| 6,421,779 B1 | * | 7/2002 | Kuroda et al. .............. 713/169 |

FOREIGN PATENT DOCUMENTS

| | | | |
|---|---|---|---|
| JP | 2000-293370 | 10/2000 | ............. G06F/9/06 |

OTHER PUBLICATIONS

Aucsmith et al., "Protecting Software from Reverse Engineering and Modification," Nikkei Electronics, Jan. 5, 1998, pp. 209–220.

Kamoshida, et al., "On Constructing Tamper Resistant Software," Technical Report of IEICE, Dec. 19, 1997, pp. 69–78.

IBM Technical Disclosure Bulletin, "Mean to Protect System From Virus", vol. 37, No. 8, Aug. 1994, pp. 659–660.

IBM Technical Disclosure Bulletin, "System For Detecting Undesired Alteration of Software", vol. 32, No. 11, Apr. 1990, pp. 48–50.

IBM Technical Disclosure Bulletin, "Automated ProgramAnalysis for Computer Virus Detection", vol. 34, No. 2, Jul. 1991, pp. 415–416.

IBM Technical Disclosure Bulletin, "Trojan Horse and Virus Detection Using Real–Time Auditing", vol. 34, No. 7B, Dec. 1991, pp. 78–81.

* cited by examiner

Primary Examiner—Hosuk Song
(74) Attorney, Agent, or Firm—William H. Steinberg, Esq.; Kevin P. Radigan, Esq.; Heslin Rothenberg Farley & Mesiti, P.C.

(57) ABSTRACT

Method, system and computer program product are provided for monitoring integrity of at least one of an executable module and an associated protected service provider (PSP) module, wherein the PSP module provides a protected service function to the executable module. A symbiont module is provided for checking integrity of at least one of the PSP module and the executable module, wherein the symbiont module comprises a separate module from the PSP module. The PSP module includes code for cross-checking integrity of the symbiont module, wherein the symbiont module checking and the PSP module cross-checking together monitor integrity of at least one of the executable module and the PSP module. Further, the protected service function can be divided into at least a first component and a second component, with the first component being implemented within the PSP module and the second component being implemented within the symbiont module.

31 Claims, 6 Drawing Sheets fig. 1 fig. 2 fig. 3A fig. 3B fig. 4 fig. 5 fig. 6

INTEGRITY CHECKING AN EXECUTABLE MODULE AND ASSOCIATED PROTECTED SERVICE PROVIDER MODULE

TECHNICAL FIELD

This invention relates to the field of detecting changes to digital information, and more particularly, to techniques for integrity checking an executable module and an associated protected service provider (PSP) module providing a protected service function to the executable module, as well as to techniques for enhancing tamper-resistance of the PSP module.

BACKGROUND OF THE INVENTION

A class of computer applications exist in which certain operations are preformed, using certain data, either or both of which must be maintained secret. In general, this is not a problem since most users will simply use the application for its intended purpose and are unconcerned with the secrets contained therein. However, some users (i.e., "hackers") may try to pry into the application and its components, either to reveal the internal secrets or to modify the application in such a way as to perform restricted or prohibited operations. In general, hackers typically employ either static disassembly and analysis, or live debugging of the subject application in order to learn its operations. Once learned, the hacker can then modify the operation according to an intended purpose. In response, tamper-resistant techniques are often applied to an application to inhibit these hacking attempts.

A variety of means can be employed to make an application and its components tamper-resistant. One of these is to make a digital "fingerprint" or signature of the application and its binary information. During initialization or at run-time (or both), modification of the protected application can be detected via an examination of the digital fingerprint in comparison to the current binary state of the application. When such activities or modifications are detected, the protected application can then intentionally fail in such a way that the secrets contained within are not exposed.

Reliable means to detect tampering activities are often difficult to implement and must become more complex as the sophistication of hackers increases. The present invention is directed to meeting this need.

DISCLOSURE OF THE INVENTION

To briefly summarize, in a first aspect, a method is provided for monitoring integrity of at least one of an executable module and associated protected service provider (PSP) module, wherein the PSP module provides a protected service function to the executable module. The method includes: providing a symbiont module for checking integrity of at least one of the PSP module and the executable module, the symbiont module comprising a separate module from the PSP module; and providing code within the PSP module for cross-checking the symbiont module, wherein the symbiont module checking and the PSP module cross-checking together monitor integrity of at least one of the executable module and the PSP module.

In another aspect, a method is presented for providing a protected service function to an executable module loaded in memory, wherein the protected service function is subdivided into a first component and a second component. The method includes: implementing the first component of the protected service function within a first executable module; and implementing the second component of the protected service function within a second executable module, wherein the first executable module and the second executable module comprise separate executable modules.

In a further aspect, a method for providing a protected service function to a calling executable module is provided which includes: providing the protected service function subdivided into a first component and a second component, wherein the first component is implemented within a first executable module and the second component is implemented within a second executable module, the first executable module and the second executable module being separate executable modules; processing the first executable module and checking integrity of the second component; upon verifying integrity of the second component, initiating the second executable module to perform the second component of the protected service function; and upon initiating the second executable module, checking integrity of the first component from the second executable module, and upon verifying integrity of the first component, completing the protected service function by processing the second executable module and returning a result to either the first executable module or the calling executable module.

Systems and articles of manufacture corresponding to the above-summarized methods are also described and claimed herein.

To restate, provided herein are various techniques for performing integrity checking of an executable module of an application program, e.g., subsequent to loading of the executable module into memory by an operating system loader, as well as to checking of a protected service provider (PSP) module associated with or providing a protected service function to the executable module. An independent monitor entity is disclosed which comprises a separate executable module from code comprising the PSP module, thereby inhibiting the monitor entity from being easily detected or defeated, and thus increasing the tamper-resistance protection afforded an application module. The monitor entity (herein also referred to as "symbiont module") runs in conjunction with the PSP module and can be either launched by the application comprising the executable module, or by the operating system, e.g., at initialization. Thus, as explained further below, the monitor entity can be started in a variety of ways and can run independently in the operating system.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

In general, this invention proposes using an independent software "monitor" entity or symbiont module that runs in conjunction with an application to check the validity of the application, or more specifically an executable module of the application, while it is running. Although implementable within the application itself, the symbiont code can stand alone as an independent process or thread within the system to make debugging of the combined application more difficult.

In an enhanced embodiment, a protected service function provided by a protected service provider (PSP) module to the executable module can be subdivided into a first component and a second component, with the first component remaining with the PSP module and the second component being implemented within the symbiont module. Advantageously, in this embodiment, the symbiont module integrity checks the PSP module, while the PSP module integrity cross-checks the symbiont module thereby further ensuring validity of the protected service function, as well as making unauthorized access thereto move difficult.

As used herein, the following terms are employed:

executable module—A collection of digital information, typically comprising data and instructions to be executed by the processor of a computer. This collection of information is often stored as a 'file' on some medium such as a hard-drive, from which it is loaded into memory (or random-access memory, RAM) and executed. Examples of executable modules include (using common naming conventions), but are not limited to, 'executables' (files whose suffix is .exe or .com), dynamic link libraries (whose suffix is .dll), and device drivers (whose suffix may be, for example, .vxd, .drv, .sys, or .mpd).

digital signature—a digital 'fingerprint' of a collection of digital data (such as the entirety or any subsection of an executable module). A digital signature, in order to be useful, typically has the following properties: 1) It is created by applying a concise, well-defined, repeatable process (typically mathematical) to a collection of digital data. 2) The digital signature has an extremely high likelihood of changing if any piece or pieces of the collection of digital data change. 3) For a digital signature to be effective, there should be a nearly zero likelihood of finding any sequence of digital data that results in the same digital signature as any other sequence of digital data. 4) The digital signature is relatively small when compared to the size of the collection of digital data to which the signature generating process is typically applied. Note that the signature generating process can vary from quite elementary and easy to defeat (such as a checksum), to cryptographically strong and secure methods, such as the Message Digest 5 hash (MD5).

symbiont module or monitor—An independent executable module, or a subsection of an executable module, whose function is to periodically or continuously examine one or more other executable modules, or subsections of executable modules, to verify the integrity of those modules or subsections as they appear in computer memory (Random Access Memory) or elsewhere. Optionally, the symbiont module may also participate in the computations performed primarily by some other executable module whose integrity the symbiont is checking (i.e., the symbiont may provide function as well as integrity checking), thereby more tightly coupling the symbiont to the checked executable module(s). The symbiont executable module and its integrity checking can be implemented in one of two modes: as an independent thread of execution, or as a function called from one or more of the executable modules it is checking, thereby operating within their thread of execution. In the latter case, communications with the symbiont is via some other form of signaling mechanism known to those skilled in the art (e.g., shared memory, semaphore, mutex, etc.). The integrity checking might entail the generation of a digital signature from the digital data and instructions composing an executable module, or a subset of an executable module, then comparing that signature with one generated from the same executable module whose integrity is known to be good. A symbiont module might also perform other examinations of an executable module or subsection, or it might query the operating system, or examine attributes of activity within the computer system to determine whether a "hacker" might be attempting to illicitly observe, modify, or misuse the instructions or data within an executable module. Though such a monitor typically examines the image of an executable module as it appears in RAM, a monitor is not precluded from examining the image of an executable module or subsection as stored in a medium other than RAM, for example, on a hard drive, or processor cache.

protected service provider—An executable module, or subsection of an executable module, comprising instructions or data which are secret, confidential, or proprietary, and are not intended to be made public. The protected service provider provides a protected service function to an application comprising one or more executable modules.

defensive action—Any action taken at the discretion of the creator or user of a protected service provider, when integrity checking reveals that the integrity of the protected service provider has been or is about to be compromised. This might mean, for example, that the protected service provider's digital signature has changed, that a debugger is active, or that some other unauthorized or suspicious change has occurred in the system. Defensive action might include, but is not limited to, any combination of the following: terminating execution of the protected service provider, notifying the user that illicit activity has been detected, logging that illicit activity has been detected, sending a transmission (if possible) detailing the illicit activity to another location, altering the instructions or data of the protected service provider to yield false or misleading results (but allowing execution to continue), causing an execution fault, rebooting the computer, or instructing the computer to power off.

Figure 1:
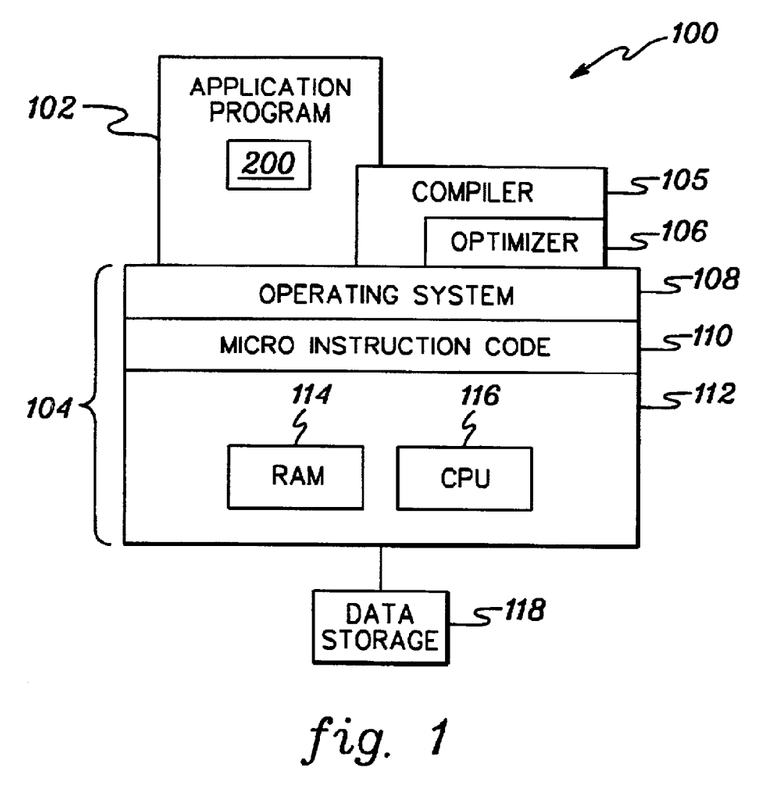
FIG. 1 is a block diagram of one embodiment of computer system hardware to employ tamper-resistance checking in accordance with the principles of the present invention.

Referring now to the drawings, wherein FIG. 1 is a block diagram showing a computer system 100 on which an embodiment of the present invention may operate. The embodiment includes one or more application programs, one program 200 of which is shown by way of example in FIG. 2. Another type of application program 102 is a compiler 105 which includes an optimizer 106. The compiler 105 and optimizer 106 are configured to transform a source program (like an application program 102) into optimized executable code. More generally, the source program is transformed to an optimized form and then into executable code. As part of this process, compiler 105 assigns a default load address for loading the executable module into memory, such as RAM 114, from a data storage device 118.

The compiler 105 and optimizer 106 operate on a computer platform 104 that includes a hardware unit 112. The hardware unit 112 includes one or more central processing units (CPU) 116, random access memory (RAM) 114, and an input/output interface (not shown). Micro instruction code 110, for instance a reduced instruction set, may also be included on the platform 104. Various peripheral components may be connected to the computer platform 104, including a data storage device 118. A link may also be included to connect system 100 to one or more similar systems (not shown).

An operating system 108 coordinates the operation of the various components of the computer system 100. An example of computer system 100 like this is the IBM RISC System/6000 (RISC System/6000 is a trademark of IBM Corporation). It is readily understood by those skilled in the art, however, that the concepts described hereinbelow are applicable to other types of computer systems 100, whether stand-alone systems or networked systems.

Figure 2:
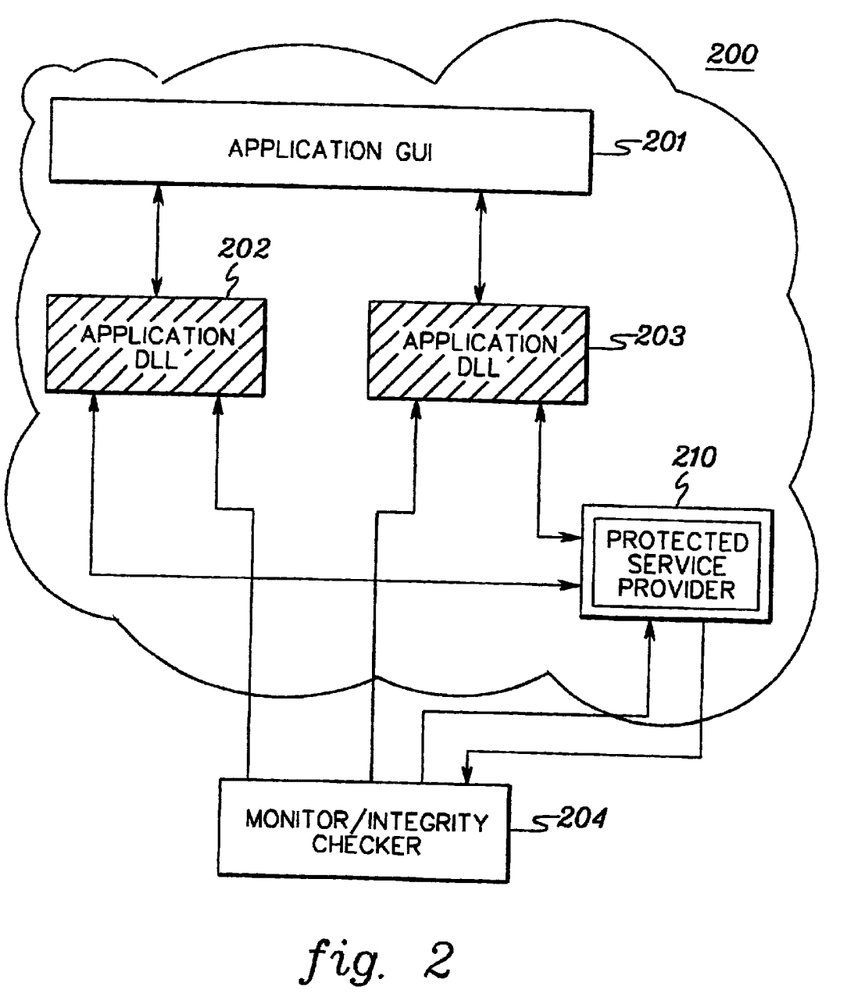
FIG. 2 depicts a system overview wherein an application comprises multiple executable modules 201, 202 & 203 interfaced with a protected service provider 210, such as a descrambler for a digital video disk player, both of which are interfaced to a monitor/integrity checker 204 in accordance with the principles of the present invention.

As noted, FIG. 2 depicts one embodiment of an application program to employ the concepts of the present invention. Application program 200 includes an application graphical user interface (GUI) 201, a first application dynamic link library (DLL) 202, and a second application DLL 203. In this example, DLLs 202 and 203 comprise executable modules and interface with a protected service provider 210, as well as a monitor/integrity checker 204. Protected service provider 210 may comprise part of the application or be interfaced to the application, in which case the protected service provider could comprise a second application.

The protected service provider may contain confidential information, and in one embodiment implements tamper-resistance code in accordance with the principles of this invention. Because application DLLs 202 & 203 interface with the protected service provider 210, it is desirable to ensure that neither DLL has been modified for possible illicit use in opening the protected service provider. Thus, application DLLs 202 & 203 may undergo examination as a prerequisite to accessing the protected service provider, and may be periodically re-examined dynamically at run time. As one example, the protected service provider may comprise a descrambler module for a digital video disc player, in which case the protected service function provided by the PSP module would comprise a descramble function.

The monitor/integrity checker 204, also referred to herein as symbiont code, preferably comprises an independent monitor program that is launched by the protected service provider, or by the operating system, and runs independently in the operating system (OS). The monitor entity can be started in a variety of ways, some of which are more robust than others:

The application can spawn a thread (or a separate process) to initiate independent execution of the monitor entity. In the Windows operating system, for example, there are several ways to initiate the execution of code sequences within an independent thread or process. In this approach, however, the code for the monitor is actually loaded into memory at the same time as the executable module.

The symbiont code can be created as a separately compiled program, device driver, or service. In such an embodiment, the symbiont code is actually started by the operating system, for example, as it boots. In a sense, the symbiont code lies dormant, waiting for the application employing the protected service provider to initialize and begin execution, at which time the symbiont code begins its functions. This technique is stronger in that the symbiont code when installed to load as the OS boots, appears not to be part of the application at all, drawing little attention to itself.

Initial communications between the application and the symbiont code may be effected in a number of ways including, but not limited to: device driver input/output control commands (IOCTLs), shared memory, named pipes, or socket communications APIs.

To summarize, application DLLs 202 & 203 make function calls to protected service provider module 210 for access to a protected service function. Monitor/integrity checker 204 provides integrity checking functions, for example, to both the protected service provider 210, as well as to application DLLs 202 & 203. In an alternate embodiment, the protected service provider module 210 could comprise an integrity checker for the application DLLs 202 & 203, as well as a cross-checker to the monitor/integrity checker 204. An interprocess communication link would also exist between the PSP module 210 and the monitor/integrity checker 204 in various embodiments of the invention described further hereinbelow.

Further, monitor/integrity checker 204 (in one embodiment) is dedicated to integrity checking a specific application to which the protected service provider module provides a protected service function. The specific application undergoes integrity checking while in memory and executing. As noted, the monitor 204 may be spawned independently of the application (e.g., as a device driver which loads at operating system boot time).

Figure 3A:
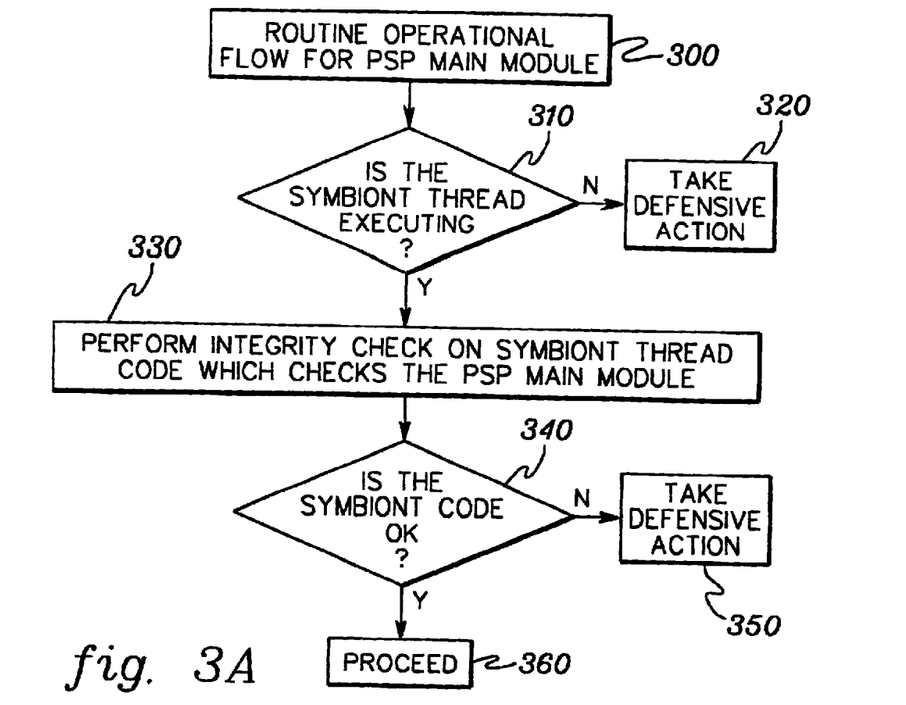
FIG. 3a is a flowchart of one embodiment of code implemented by the PSP module for integrity cross-checking the symbiont code in accordance with the principles of the present invention.
Figure 3B:
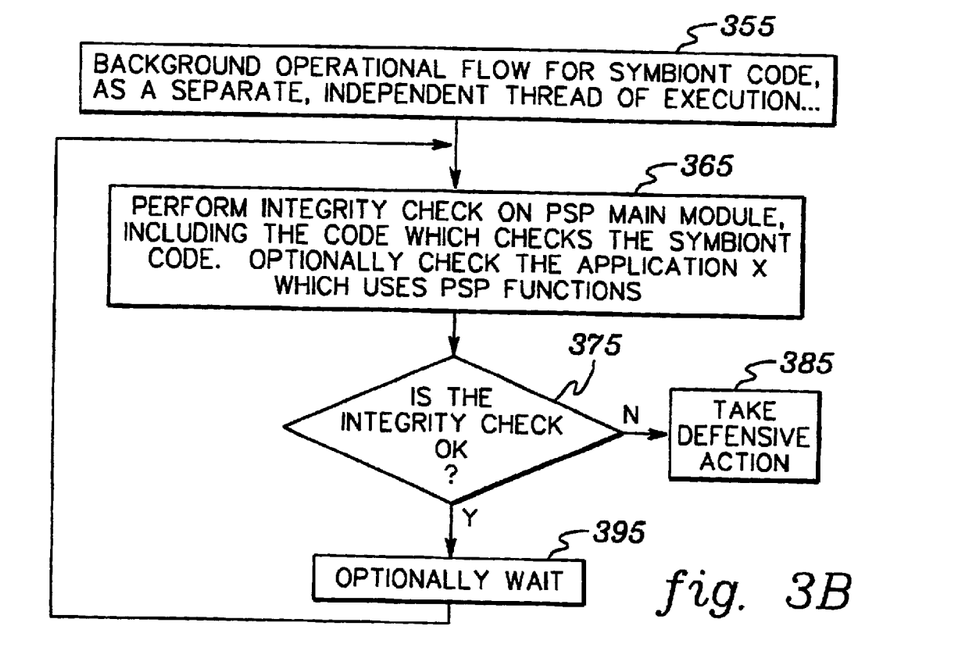
FIG. 3b is a flowchart of one embodiment of integrity checking performed by the symbiont module on the PSP module in accordance with the principles of the present invention.

FIG. 3a depicts one flowchart embodiment of integrity cross-checking performed by the PSP main module on the symbiont code (i.e., the monitor/integrity checker 204), while FIG. 3b is one flowchart embodiment of integrity checking performed by the symbiont code on the PSP module. This example assumes that the symbiont code is executing on a separate thread from that executing the PSP module. Beginning with FIG. 3a, integrity checking of the symbiont code, which can be implemented within the routine operational flow of the PSP main module 300, initially determines whether the symbiont thread is executing 310. An assumption is made that the symbiont code must be executing in order to be valid, and if the symbiont thread is not executing then a defensive action is taken 320. If the thread is executing, then the PSP module performs integrity checking on the symbiont code which is to check the PSP main module, and determines whether the symbiont code is valid 340. If "no", defensive action is again taken 350. Otherwise, the symbiont code is executing and valid, and the PSP continues with the main operational flow.

As shown in FIG. 3b, in one embodiment of the present invention, the symbiont code implements integrity checking from a background operational flow 355. This integrity checking is a separate, independent thread of execution from the PSP module. The symbiont code performs integrity checking on the PSP main module, including the code itself which checks the symbiont code 365. Optionally, the symbiont code could also check an application x which is using the PSP functions. The symbiont code determines whether the PSP module is valid 375, and if not, takes defensive action 385. If valid, the symbiont code may wait a period of time 395 before again performing integrity checking of the PSP main module.

Figure 4:
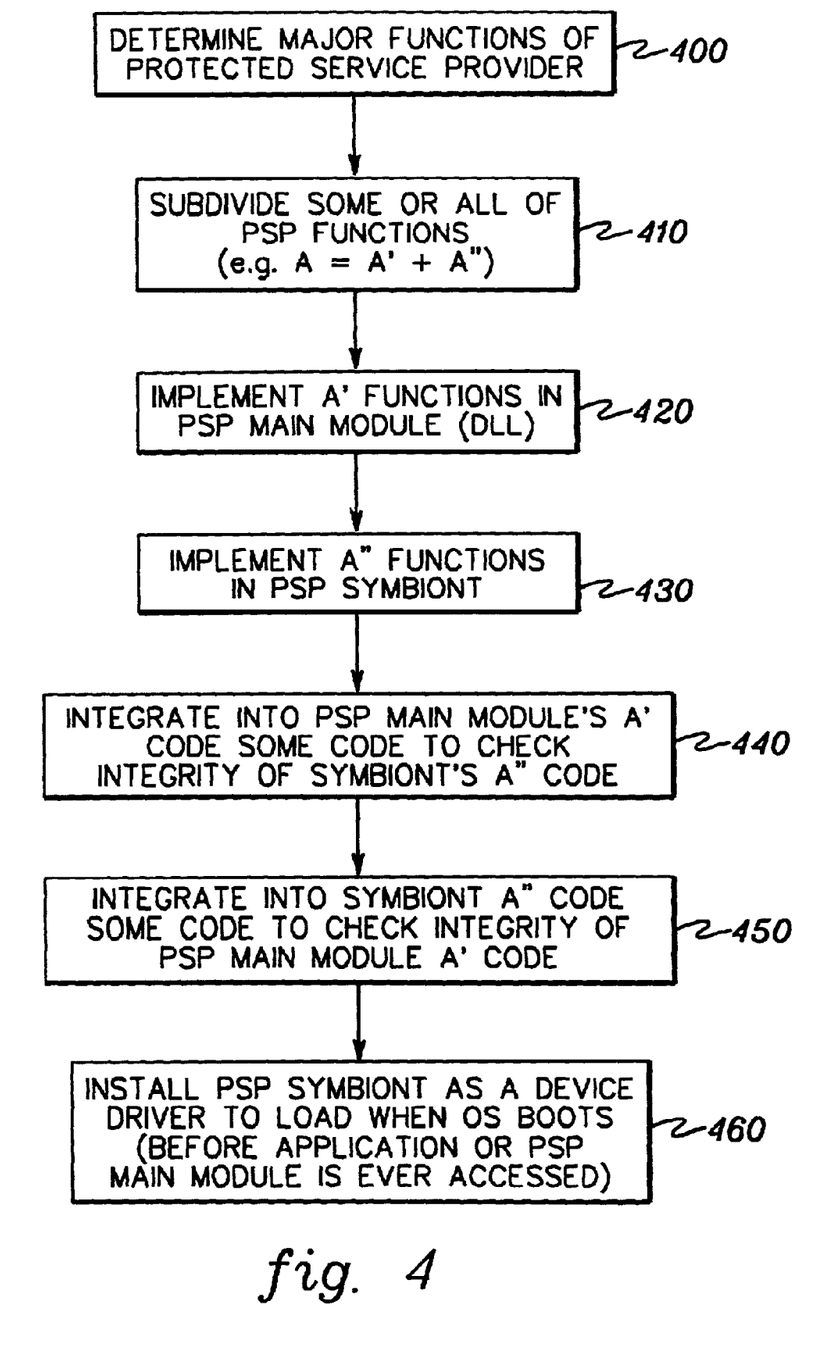
FIG. 4 is a flowchart of one embodiment for sharing a protected service function between the PSP module and the symbiont code, as well as integrity checking and cross-checking between the PSP module and the symbiont code in accordance with the principles of the present invention.

As an enhancement to the above-described monitoring approach, presented herein is the concept of subdividing one or more protected service functions among multiple independent threads of execution. A group of mutually dependent, cross-checking modules would even be more tamper resistant. Thus, a protected service function can be divided into two or more threads of execution, and each thread of execution can integrity check at least one other module, with each module containing a portion of the critical, i.e., protected, function. FIG. 4 depicts one embodiment for implementing this concept.

Initially, the major functions of the protected service provider are determined 400, and one or more of the protected service functions are subdivided into two or more components 410. For example, protected service function A is subdivided into a first component A' and a second component A". First component A' is then implemented within the PSP main module 420, while the second component A" is implemented within the PSP's symbiont code 430. Integrity checking code is implemented within the PSP main module, for example, within the first component A' itself to check integrity of the second component A" implemented within the symbiont code 440. Similarly, the symbiont code is implemented with integrity checking, for example, from the second component A", of the first component A' in the PSP main module 450. In one embodiment, the PSP symbiont can then be installed as the device driver to load when the operating system boots 460.

Figure 5:
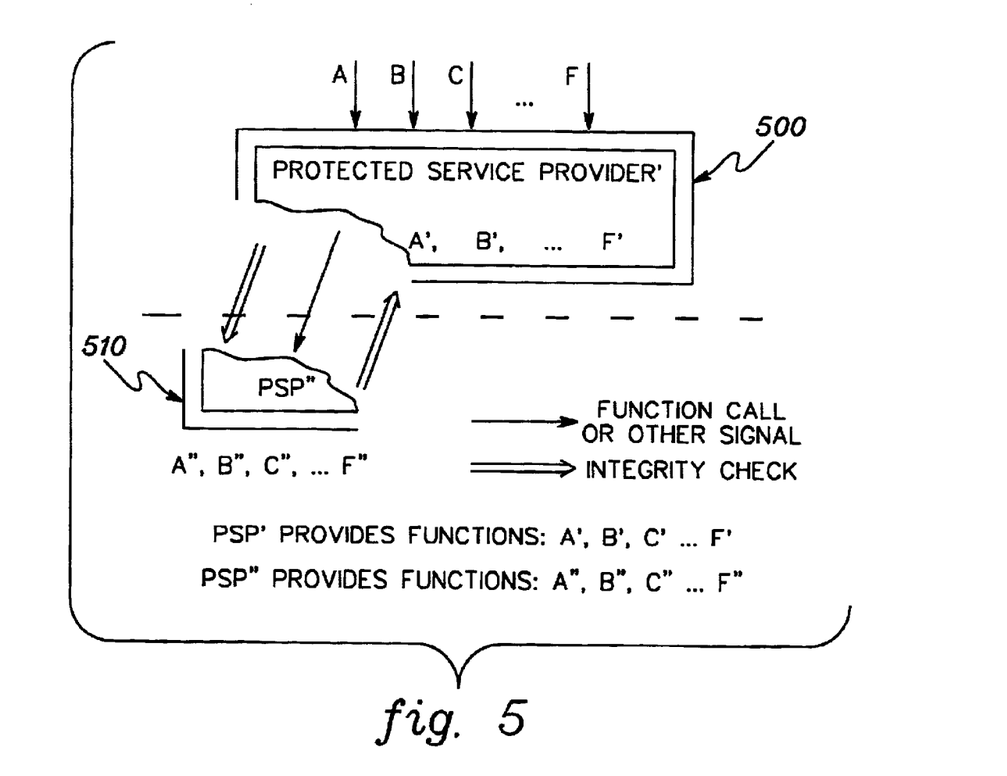
FIG. 5 is a representation of dividing a protected service provider function into first and second components which, in one embodiment, are implemented in separate threads of execution within the protected service provider module and the symbiont code in accordance with the principles of the present invention.

FIG. 5 graphically depicts the concept of a subdivided protected service function in accordance with one aspect of the present invention. Calls are made for protected service functions A, B, C, . . . F to the main protected service provider 500 wherein first components A', B', C', . . . F' of the respective protected service functions A, B, C, . . . F exist. The protected service function is performed in one embodiment by implementing a function call from the first component to a second component implemented within a second protected service provider module 510. As shown, second protected service provider module 510 implements second components A", B", C", . . . F". Commensurate with placing the function call from the first component to the second component, the second component integrity checks the first component, and the first component integrity checks the second component. As represented by the phantom line, the first protected service provider module 500 and the second protected service provider module 510 preferably comprise independent executable modules. As used herein, the second protected service provider module 510 comprises symbiont code to the main protected service provider module 500. Further, although described herein with respect to first and second modules 500 & 510, the concepts presented can be readily implemented by one skilled in the art among more than two separate executable modules.

Figure 6:
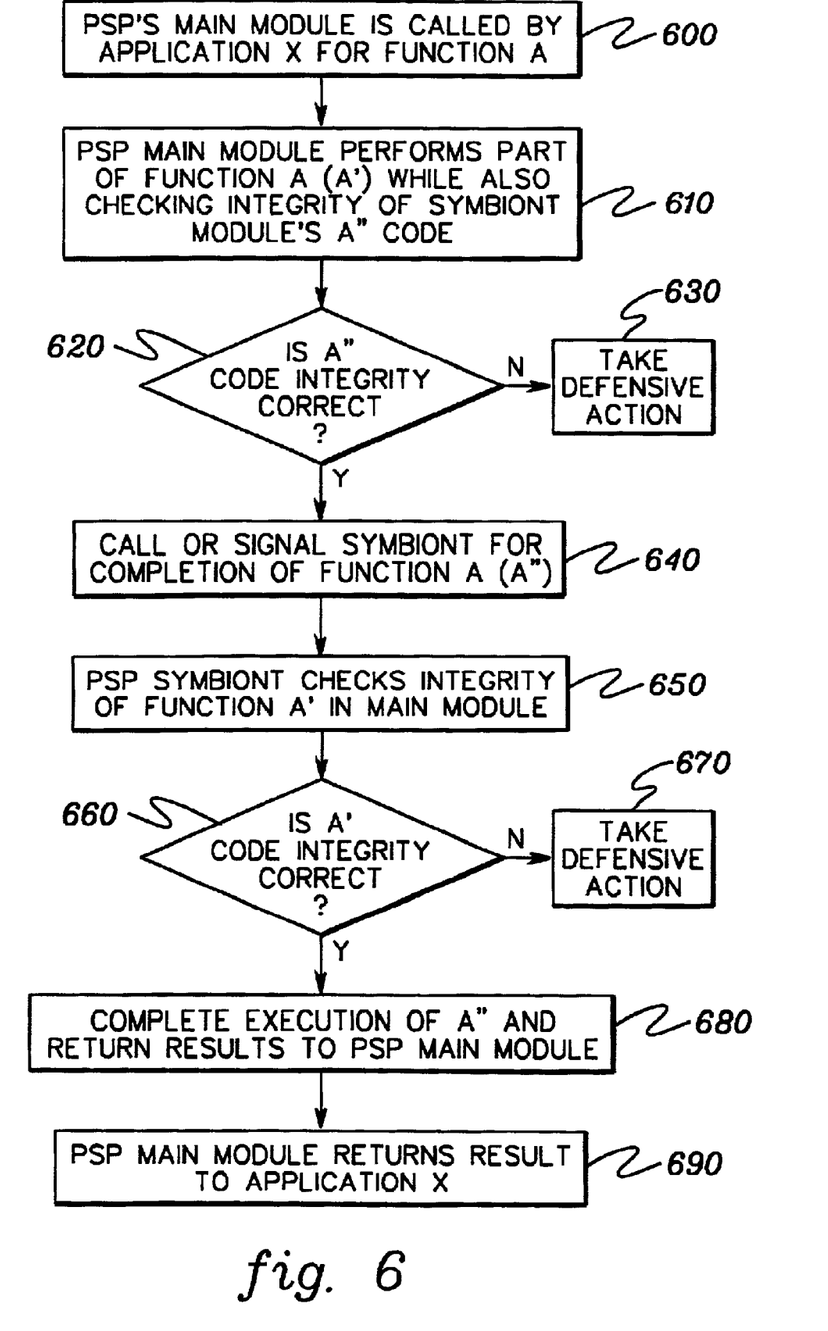
FIG. 6 is a flowchart of a further embodiment of a shared implementation of a protected service function between the protected service provider module and the symbiont code, as well as integrity checking and cross-checking therebetween in accordance with the principles of the present invention.

FIG. 6 is a flowchart representation of one embodiment for implementing a combined protected service function subdivision and integrity checking in accordance with the principles of the present invention. A PSP main module is called by an executable module of an application x for a protected service function A 600. The PSP main module performs part of function A (i.e., first component A') while also checking integrity of the second component A" code residing in a symbiont module 610. Processing determines whether integrity of the second component A" code is correct 620, and if not, takes defensive action 630. Assuming that the integrity of the second component is correct, then a call is placed to the symbiont module (either an explicit call or the symbiont is otherwise signaled to begin execution) for completion of protected service function A (i.e., execution of second component A") 640.

Once called, the symbiont code checks integrity of the first component A' in PSP main module 650. Processing determines whether first component A' code integrity is correct 660, and if not, again takes defensive action 670. If the integrity of the first component A' is correct, then the second component A" code is executed, and returns a result to the PSP main module 680. The PSP main module 680 then returns the result of the protected service function call to application x 690.

To summarize, those skilled in the art will note from the above discussion that the actions of the monitor/integrity checker (i.e., symbiont code) with respect to the application proper are any or all of the following:

The monitor performs periodic signature analysis on the memory region of the application proper. This helps detect unauthorized modification of the application, either before loading or during execution. The former detection helps to thwart "black box" attacks where the application is statically modified (in 'permanent' storage, typically a hard drive) in order to perform unauthorized operations. The latter helps to detect certain debug activities (e.g., putting a breakpoint in the application actually causes the binary signature of the memory image of the application to change).

The monitor performs some portion of the application's protected computations. Thus, disabling the monitor entity will "break" the application, causing it to cease to function correctly.

The application and/or monitor may contain and execute calls to each other which are unnecessary, or whose computations are circuitous or difficult to follow, in order to mislead a possible observer.

The monitor verifies that calls from the application actually come from the address range (in memory) at which the application should, or is known to, reside, and vice-versa.

The application can also perform integrity checking (digital signatures or checksums) on the monitor entity.

The monitor examines elements of the operating system, disjoint from the application itself, in order to detect disallowed debugging operations.

In the event that the monitor detects any improper actions or any signature changes of the application itself, it can take independent actions to disable the application, disable the improper debugging activity, or possibly even to reboot or otherwise halt the system in order to terminate the undesirable activity. Or, it could render its computations invalid without overtly notifying the hacker that this activity has been detected. Responses to attacks may be varied from occurrence to occurrence, i.e., unpredictability can be provided in its reactions, thereby making the application/monitor pair more difficult to hack.

If some form of network connection is available, the monitor may also report the detected activities to an outside observer. This technique would be useful if the application required data (or its function was to access protected data) from a server on the Internet. In this case, the reporting of the illegal activities could be used to bar the offender from subsequent access to the server data.

Note that the total application may be composed of more than one execution entity (device driver, process, thread, for example); likewise, the monitor may consist of more than one execution entity as well. The key is that the application and monitor are separate, and the monitor is "dedicated" to the application.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for monitoring integrity of an executable module and associated protected service provider (PSP) module, said PSP module providing a protected service function to said executable module, said method comprising:
   (i) providing a symbiont module for checking integrity of said PSP module, said symbiont module comprising a separate module from said PSP module, and running independently from said PSP module and said executable module;
   (ii) providing code within said PSP module for cross-checking said symbiont module, wherein said symbiont module checking and said PSP module cross-checking together monitor integrity of said PSP module; and
   (iii) providing code within said PSP module for monitoring integrity of said executable module.

2. The method of claim 1, wherein said protected service function of said PSP module is divided into a first component and a second component, and wherein said method further comprises implementing said first component of said protected service function within said PSP module and implementing said second component of said protected service function within said symbiont module.

3. The method of claim 2, wherein disabling of said symbiont module disables said protected service function provided by said PSP module to said executable module.

4. The method of claim 1, wherein said protected service function comprises one function of a plurality of functions provided by said PSP module to said executable module, and wherein said method further comprises subdividing each of at least some functions of said plurality of functions into a first component and a second component, and for each of said at least some functions, implementing said first component within said PSP module and implementing said second component within said symbiont module.

5. The method of claim 1, wherein said providing of said symbiont module comprises loading of said symbiont module independent of loading of said PSP module.

6. The method of claim 5, wherein said executable module is processed within a system, and wherein said loading of said symbiont module comprises loading said symbiont module at initialization of said system, and subsequently loading said PSP module commensurate with said protected service function being requested by said executable module.

7. A method for providing a protected service function to an executable module loaded in memory, said method comprising:
   subdividing the protected service function into a first component and a second component;
   implementing said first component of the protected service function within a first executable module; and
   implementing said second component of the protected service function within a second executable module, wherein said first executable module and said second executable module comprise separate executable modules, which together monitor integrity of the executable module loaded in memory.

8. The method of claim 7, wherein said first executable module comprises a protected service provider module, and said second executable module comprises a symbiont module, said symbiont module being separately loaded from loading of said protected service provider module.

9. The method of claim 8, further comprising integrating into said protected service provider module code for checking integrity of said symbiont module, and integrating into said symbiont module, code for checking integrity of said protected service provider module.

10. The method of claim 9, further comprising installing said symbiont module as a device driver to load when an operating system is booted, wherein said operating system oversees execution of said executable module.

11. The method of claim 7, wherein said second executable module provides a result to said first executable module, and wherein said first executable module provides said protected service function to said executable module.

12. A method for providing a protected service function to a calling executable module, said method comprising:
   providing said protected service function subdivided into a first component and a second component, wherein said first component is implemented within a first executable module and said second component is implemented within a second executable module, said first executable module and said second executable module being separate executable modules;
   processing said first executable module and checking integrity of said second component;

upon verifying integrity of said second component, initiating said second executable module to perform said second component of said protected service function; and upon initiating said second executable module, checking integrity of said first component from said second executable module, and upon verifying integrity of said first component, completing said protected service function by processing said second executable module and returning a result to one of said first or said calling executable module.

13. The method of claim 12, wherein if said second component fails said integrity checking, taking defensive action in response thereto, or if said first component fails said integrity checking, taking defensive action in response thereto.

14. A system for monitoring integrity of an executable module and associated protected service provider (PSP) module, said PSP module providing a protected service function to said executable module, said system comprising:

means for providing a symbiont module for checking integrity of said PSP module, said symbiont module comprising a separate module from said PSP module, and running independently from said PSP module and said executable module;

means for providing code within said PSP module for cross-checking said symbiont module, wherein said symbiont module checking and said PSP module cross-checking together monitor integrity of said PSP module; and means for providing code within said PSP module for monitoring integrity of said executable module.

15. The system of claim 14, wherein said protected service function of said PSP module is divided into a first component and a second component, and wherein said system further comprises means for implementing said first component of said protected service function within said PSP module and means for implementing said second component of said protected service function within said symbiont module.

16. The system of claim 15, further comprising means for disabling said protected service function provided by said PSP module to said executable module upon disabling of said symbiont module.

17. The system of claim 14, wherein said protected service function comprises one function of a plurality of functions provided by said PSP module to said executable module, each of at least some functions of said plurality of functions being subdivided into a first component and a second component, and wherein said system further comprises for each of said at least some functions, means for implementing said first component within said PSP module and for implementing said second component within said symbiont module.

18. The system of claim 14, wherein said means for providing said symbiont module comprises means for loading said symbiont module independent of loading of said PSP module.

19. The system of claim 18, wherein said executable module is overseen by an operating system, and wherein said means for loading of said symbiont module comprises means for loading said symbiont module at initialization of said operating system, and means for subsequently loading said PSP module commensurate with said protected service function being requested by said executable module.

20. A system for checking integrity of an executable module and an associated protected service provider (PSP) module, said PSP module providing a protected service function to said executable module, said system comprising:

a computing unit adapted to implement a symbiont module for checking integrity of said PSP module, said symbiont module comprising a separate module from said PSP module, and running independently from said PSP module and said executable module;

said computing unit being further adapted to implement code within said PSP module for cross-checking said symbiont module, wherein said symbiont module checking and said PSP module cross-checking together monitor integrity of said PSP module; and said computing unit being further adapted to implement code within said PSP module for monitoring integrity of said executable module.

21. A system for providing a protected service function to a calling executable module loaded in memory, said system comprising:

means for subdividing the protected service function into a first component and a second component;

means for implementing said first component of said protected service function within a first executable module; and means for implementing said second component of said protected service function within a second executable module, wherein said first executable module and said second executable module comprise separate executable modules running independently, which together monitor integrity of the executable module loaded in memory.

22. The system of claim 21, wherein said first executable module comprises a protected service provider module, and said second executable module comprises a symbiont module, said symbiont module being separately loaded from said protected service provider module.

23. The system of claim 22, further comprising means for integrating code into said protected service provider module for checking integrity of said symbiont module, and for integrating code into said symbiont module for checking integrity of said protected service provider module.

24. The system of claim 23, further comprising means for installing said symbiont module as a device driver to load when an operating system is booted, wherein said operating system oversees execution of said executable module.

25. The system of claim 21, further comprising means for providing a result to said first executable module from said second executable module, and means for providing said protected service function to said calling executable module from said first executable module.

26. A system for providing a protected service function to an executable module loaded in memory said system comprising:

a computing unit adapted to subdivide the protected service function into a first component and a second component;

said computing unit being adapted to implement said first component of said protected service function within a first executable module; and said computing unit being further adapted to implement said second component of said protected service function within a second executable module, wherein said first executable module and said second executable module comprise separate executable modules running independently, which together monitor integrity of the executable module loaded in memory.

27. A system for providing a protected service function to a calling executable module, said system comprising:

means for providing said protected service function subdivided into a first component and a second component, wherein said first component is implemented within a first executable module and said second component is implemented within a second executable module, said first executable module and said second executable module being separate executable modules;

means for processing said first executable module and checking integrity of said second component;

means for initiating said second executable module, upon verifying integrity of said second component, to perform said second component of said protected service function; and means for checking integrity of said first component from said second executable module, upon initiating said second executable module, and upon verifying integrity of said first component, for completing said protected service function by processing said second executable module and returning a result to one of said first executable module or said calling executable module.

28. The system of claim 27, further comprising means for taking defensive action if said second component fails said integrity checking, and means for taking defensive action if said first component fails said integrity checking.

29. An article of manufacture comprising:

a computer program product comprising computer usable medium having computer readable program code means therein for use in monitoring integrity of an executable module and associated protected service provider (PSP) module, said PSP module providing a protected service function to said executable module, said computer readable program code means in said computer program product comprising:

computer readable program code means for causing a computer to effect checking integrity of said PSP module from a symbiont module, said symbiont module comprising a separate module from said PSP module, and running independently from said PSP module and said executable module;

computer readable program code means for causing a computer to effect cross-checking said symbiont module from code within said PSP module, wherein said symbiont module checking and said PSP module cross-checking together monitor integrity of said PSP module; and computer readable program code means for causing a computer to effect monitoring integrity of said executable module from code within said PSP module.

30. An article of manufacture comprising:

a computer program product comprising computer usable medium having computer readable program code means therein for use in providing a protected service function to an executable module loaded in memory, said computer readable program code means in said computer program product comprising:

computer readable program code means for causing a computer to effect subdividing the protected service function into a first component and a second component;

computer readable program code means for causing a computer to effect implementing said first component of said protected service function within a first executable module; and computer readable program code means for causing a computer to effect implementing said second component of the protected service function within a second executable module, wherein said first executable module and said second executable module comprise separate executable modules running independently, which together monitor integrity of the executable module loaded in memory.

31. An article of manufacture comprising:

a computer program product comprising computer usable medium having computer readable program code means therein for use in providing a protected service function to a calling executable module, said computer readable program code means in said computer program product comprising:

computer readable program code means for causing a computer to effect providing said protected service function subdivided into a first component and a second component, wherein said first component is implemented within a first executable module and said second component is implemented within a second executable module, said first executable module and said second executable module being separate executable modules;

computer readable program code means for causing a computer to effect processing said first executable module and checking integrity of said second component;

computer readable program code means for causing a computer to effect initiating said second executable module, upon verifying integrity of said second component, to perform said second component of said protected service function; and computer readable program code means for causing a computer to effect checking integrity of said first component from said second executable module, upon initiating said second executable module, and upon verifying integrity of said first component completing said protected service function by processing said second executable module and returning a result to one of first executable module or said calling executable module.

* * * * *